E. T. BRIGHAM.

TOWEL RACK.

APPLICATION FILED MAR. 17, 1921.

15,147.

Reissued July 12, 1921.

Witnesses:
W. Schnellhardt
B. G. Richards

Inventor
Edwin T. Brigham
By Joshua R. H. Hoff
His Attorney

UNITED STATES PATENT OFFICE.

EDWIN T. BRIGHAM, OF KANSAS CITY, MISSOURI, ASSIGNOR TO JACQUES ROUSSO, OF LOS ANGELES, CALIFORNIA.

TOWEL-RACK.

15,147. Specification of Reissued Letters Patent. Reissued July 12, 1921.

Original No. 1,371,295, dated March 15, 1921, Serial No. 669,502, filed January 4, 1912. Application for reissue filed March 17, 1921. Serial No. 453,150.

*To all whom it may concern:*

Be it known that I, EDWIN T. BRIGHAM, a citizen of the United States, and a resident of Kansas City, in the county of Jackson and State of Missouri, have invented certain new and useful Improvements in Towel-Racks, of which the following is a specification.

My invention relates to towel racks for use chiefly in public buildings, clubs, factories, bath houses and like places, where face towels are frequently carried away or thrown carelessly aside, and my object is to produce a device of this character upon which towels can be accessibly hung with more than a reasonable degree of security against loss by theft or carelessness.

A further object is to provide a rack having an arm for the support of clean towels, a second arm for the support of soiled towels and a connection between said arms over which the towels after use may be slipped, to separate them from the remaining or clean towels.

A further object is to produce a towel rack of the character outlined of simple, strong, durable and cheap construction.

With these objects in view and others as hereinafter appear, the invention consists in certain novel and peculiar features of construction and organization as hereinafter described and claimed; and in order that it may be fully understood, reference is to be had to the accompanying drawing, in which, Figure 1 is a perspective view of a towel rack and supporting means embodying my invention;

Figure 2:
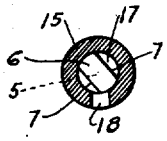
Fig. 2 is an enlarged section of the device or socket piece for receiving and reliably holding one end of the rack.
Figure 3:
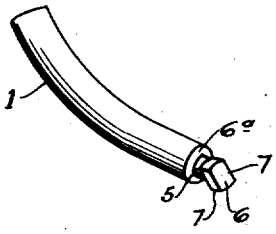
Fig. 3 is an enlarged perspective view of the end of the rack for engagement with said socket piece.
Figure 4:
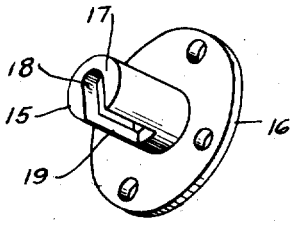
Fig. 4 is an enlarged detail perspective view of the said socket piece.
Figure 1:
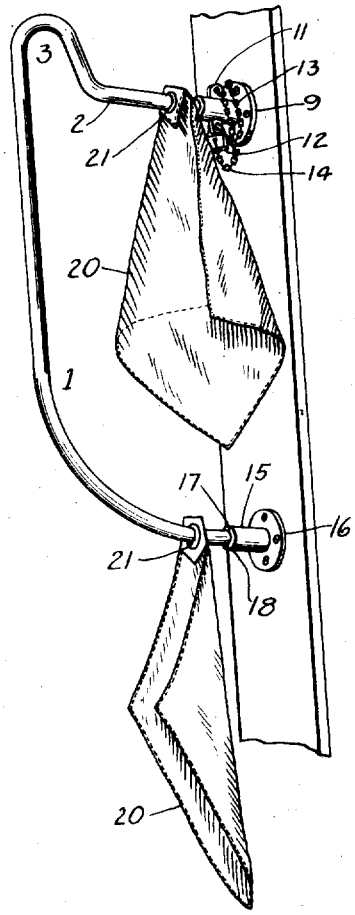
Figure 5:
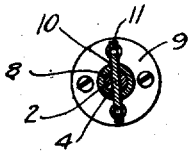
Fig. 5 is a vertical section taken through the other end of the rack, a second socket piece for receiving said end, and a pin for locking the said parts together.

In the said drawing, a spring rod is bent to approximately U-form, and comprises a substantially J-shaped arm 1, a substantially horizontal arm 2 above the lower end or terminal of the J-shaped arm, and an arched portion 3 connecting the upper end of arm 1 and the outer end of arm 2.

Arm 2 near its free end is provided with a diametric opening 4, and the lower portion of arm 1, is diametrically grooved at its end to produce a neck 5 and a head 6. The head 6 is cut away at opposite sides so that its width shall be substantially the same as the diameter of the reduced portion or neck 5, the said head occupying an inclined position when the rack is vertical.

A socket device for receiving the free end of arm 2, consists of a sleeve 8, preferably provided with a base flange 9, through which securing devices fasten the socket device to a wall or other support, and said sleeve is provided with a diametric opening 10 to register with opening 4 of arm 2, and to secure said parts in fixed relation, a pin 11 extends through said alined openings and is secured in such position by a padlock 12 or equivalent device. For convenience the pin is fastened to the socket piece by a chain 13, and a chain 14 attaches the padlock to chain 13.

A socket piece for engagement by the headed end of the rack, consists of a sleeve 15, provided with a base flange 16 secured by screws or other fastening devices, to a suitable support, and the outer end of the sleeve 15 is closed by an end 17 having a slot 18, communicating with a longitudinal slot 19, in the body of said sleeve.

20 indicates towels in which are secured eyelets 21, capable of slipping on or off either end of the rack. The arm 2 is preferably employed as a support for the clean towels and a large number of the same can be strung on said arm.

The rack is secured in position by first disposing it at such an angle that its normally inclined head shall stand in a vertical position and the rack itself in a laterally inclined position. The said head is then slipped through the slot 18 endwise into sleeve 15, or it may be fitted in place by raising the rack to cause the head to enter the sleeve through slot 19. In either case the neck 5 will be disposed in slot 18 and the head 6 will engage the inner face of the end 17, of said sleeve and the shoulder 6[a] at the opposite end of the neck from the head, will bear against the outer face of said end 17.

With the parts thus arranged the rack is swung to a vertical position, its neck constituting the axis of such movement, and in assuming such vertical position the head 6 is disposed transversely of slots 18 and 19, and hence is incapable of passing through said slots or either of them. The rack is then sprung outward sufficiently to permit of the free end of arm 2 being inserted in sleeve 8, and the pin 11, is slipped through the opening 10 of sleeve 8 and the opening in arm 2, and the padlock or its equivalent is employed to prevent the withdrawal of said pin.

With the parts thus arranged, it is obvious that it is impossible for a person without a proper key, to readily remove a towel from the rack without cutting or tearing such towel, and should this be done where the towels are equipped with metal eyelets, the latter remain on the rack and will show that a towel is missing. As the towels are used they may be readily slipped forward and over the arch 3, and down upon arm 1, and from the last named arm they hang until removed from the rack for washing.

From the above description it will be apparent that I have produced a towel rack embodying the features of advantage enumerated as desirable in the statement of the object of the invention, and I wish it to be understood that while I have illustrated and described, I do not desire to be restricted to the exact details of construction shown and described as obvious modifications will suggest themselves to one skilled in the art.

Having described my invention, what I claim as new and desire to secure by Letters Patent is:

1. A towel rack comprising a combined towel support and guide member; and means mounted on said member impeding the free passage of towels, substantially as described.

2. A towel rack comprising a combined towel support and guide rod; and means mounted on said rod impeding the free passage of towels, substantially as described.

3. A towel rack comprising a support; a towel guide member extending outwardly from said support; and towel retaining means coöperating with said guide member and arranged to releasably retain towels thereon, said retaining means being arranged and adapted to permit of passage of perforated towel guiding means over and around it, substantially as described.

4. A towel rack comprising a support; a towel guide rod extending outwardly substantially horizontally from said support; and towel retaining means coöperating with said guide rod and arranged to releasably retain towels thereon, said retaining means being arranged and adapted to permit the passage of towel gromets over and around it, substantially as described.

5. A towel rack comprising a support; a towel guide member extending outwardly from said support; and towel retaining means mounted on said outwardly extending guide member and arranged to releasably retain towels thereon, substantially as described.

6. A towel rack comprising a support; a towel guide rod extending outwardly substantially horizontally from said support; and towel retaining means mounted on said guide rod and arranged to releasably retain towels thereon, substantially as described.

7. A towel rack comprising a support; a towel guide member extending outwardly from said support; and towel retaining means mounted on said outwardly extending guide member and arranged to releasably retain towels thereon, said retaining means being arranged and adapted to permit the passage of perforated towel guiding means over and around it, substantially as described.

8. A towel rack comprising a support; a towel guide rod extending outwardly and substantially horizontally from said support; and towel retaining means mounted on said outwardly extending guide rod and arranged to releasably retain towels thereon, said retaining means being arranged and adapted to permit the passage of towel gromets over and around it, substantially as described.

9. A towel rack comprising a support, and a towel guide rod detachably connected with said support, said rod consisting of an upper towel supporting portion extending outwardly substantially horizontally from said support and provided with an upwardly extending arch at its outer end, said rod extending from said arch downwardly and inwardly to said support, substantially as described.

10. A towel rack comprising a support; a towel guide rod detachably connected with said support, said rod consisting of an upper towel supporting portion extending outwardly substantially horizontally from said support and provided with an upwardly extending arch at its outer end, said rod extending from said arch downwardly and inwardly to said support; and detachable connections between the ends of said rod and said support, substantially as described.

11. A towel retainer comprising a support; brackets carried by said support; a rod having one horizontal and one substantially vertical portion; means to lock the ends of the rod in the respective brackets; and means to loosely retain towels upon the horizontal portion of the rod, substantially as described.

12. A towel rack comprising a support; a guide member extending substantially horizontally therefrom and then downwardly; and means located adjacent the outer end of said horizontally extending portion and arranged and adapted to impede but not prevent the passage of a towel therefrom, substantially as described.

13. A towel rack comprising a support; a towel guide rod extending substantially horizontally therefrom; a towel guide member extending downwardly from the outer end of said rod; and means located adjacent the outer end of said rod and arranged and adapted to impede but not prevent the passage of a towel therefrom, substantially as described.

14. A towel rack comprising a support; a towel guide rod extending substantially horizontally therefrom and then downwardly and rearwardly to said support; and means located adjacent the outer end of said horizontally extending portion and arranged and adapted to impede but not prevent the passage of a towel therefrom, substantially as described.

In testimony whereof I have signed my name to this specification in the presence of two subscribing witnesses.

EDWIN T. BRIGHAM.

Witnesses:

KENNETH W. THORPE,
GEORGE Y. THORPE.